US008693686B2

(12) United States Patent
Radatti

(10) Patent No.: US 8,693,686 B2
(45) Date of Patent: Apr. 8, 2014

(54) SECURE TELEPHONE DEVICES, SYSTEMS AND METHODS

(76) Inventor: Peter V. Radatti, Conshohocken, PA (US)

( * ) Notice: Subject to any disclaimer, the term of this patent is extended or adjusted under 35 U.S.C. 154(b) by 351 days.

(21) Appl. No.: 12/924,373

(22) Filed: Sep. 24, 2010

(65) Prior Publication Data

US 2011/0135091 A1 Jun. 9, 2011

Related U.S. Application Data

(63) Continuation-in-part of application No. 12/592,488, filed on Nov. 25, 2009.

(60) Provisional application No. 61/200,288, filed on Nov. 26, 2008.

(51) Int. Cl.
H04L 9/00 (2006.01)

(52) U.S. Cl.
USPC .......................... 380/255; 380/257

(58) Field of Classification Search
USPC ....................................... 380/257
See application file for complete search history.

(56) References Cited

U.S. PATENT DOCUMENTS

| 6,151,677 | A | 11/2000 | Walter et al. | |
|---|---|---|---|---|
| 7,146,505 | B1 | 12/2006 | Harada et al. | |
| 7,437,550 | B2 | 10/2008 | Savage et al. | |
| 7,743,260 | B2 | 6/2010 | Fetik | |
| 7,945,036 | B1 | 5/2011 | Tonogai et al. | |
| 8,090,844 | B2 | 1/2012 | Chene et al. | |
| 2001/0021252 | A1* | 9/2001 | Carter et al. | 380/247 |
| 2005/0172127 | A1 | 8/2005 | Hartung et al. | |
| 2005/0223228 | A1 | 10/2005 | Ogawa et al. | |
| 2006/0080397 | A1 | 4/2006 | Chene et al. | |
| 2006/0165020 | A1* | 7/2006 | Schultz | 370/286 |
| 2006/0200660 | A1 | 9/2006 | Woods | |
| 2006/0248337 | A1 | 11/2006 | Koodli | |
| 2007/0005962 | A1 | 1/2007 | Baker | |
| 2007/0223668 | A1 | 9/2007 | Blumenfeld et al. | |
| 2008/0126794 | A1 | 5/2008 | Wang et al. | |
| 2009/0068985 | A1 | 3/2009 | Nguyen et al. | |
| 2010/0124902 | A1 | 5/2010 | Hoh et al. | |
| 2010/0203874 | A1* | 8/2010 | Scott et al. | 455/415 |

* cited by examiner

Primary Examiner — Ghazal Shehni
(74) Attorney, Agent, or Firm — John F. A. Earley, III; Frank J. Bonini, Jr.; Harding, Earley, Follmer & Frailey, P.C.

(57) ABSTRACT

Secure telephone devices, systems and methods are provided for carrying out secure communications utilizing a telephone device that includes cryptographic storage and processing components, the cryptographic processing components including intercepting and injecting capabilities for intercepting an incoming signal, cryptographically processing the signal and injecting the system for delivery to the output of the telephone device, wherein the system and method may utilize the telephone operating system, and wherein embodiments are provided where an exchange component regulates the cryptographic information so that users engaging in secure cryptographic communications do not need to provide encryption key information to each other.

31 Claims, 5 Drawing Sheets

Logic Flow for Outgoing Call

Intercept outgoing call
|
Is the phone number flagged as a crypto call?
|  |
|  Yes *(step 2)*
|  Is the call a CPS call?
|  |  |
|  |  Yes
|  |  Dial the preprogrammed CPS phone number
|  |  Handshake and send the "desired number dialed"
|  |  Phone call continues
|  No
|  Must be a P2P call
|  Place "dialed" number, handshake with the other P2P phone
|  Phone call continues
No
Place call as a normal cell phone call
Listen for the signal to convert to a crytpo call.
|  |
|  Signal received to convert
|  restart logic flow at step 2
No conversion
Call continues as normal cell phone call

FIG. 2

Logic Flow for Conversion of Standard Call to Encrypted Call

During unencrypted standard call listen for conversion signal (999 keypad)

Conversion signal received
|
Is call unencrypted
|   |
|   No, call is already encrypted. Ignore signal.
Is this a CPS call?
|   |
|   Yes, callerid must be defective. Transmit cell phone number.
|   Handshake and send the "desired number dialed". Phone call continues
No
Callerid must be defective.
Ask user to select encryption key from database.
Start encryption, handshake, call continues.

FIG. 3

Logic Flow for Incoming "Call Waiting" Call

Version 1 of this software may disable call waiting to be implemented later. If so then call waiting must not be allowed to be processed in the cell phone.

Intercept incoming "call waiting" call.
Place current call "on hold" along with the in-use encryption key
Restart new call using Logic Flow for Incoming Call Allow user to switch between multiple active calls insuring that the encryption key is switched as appropriate.

FIG. 4

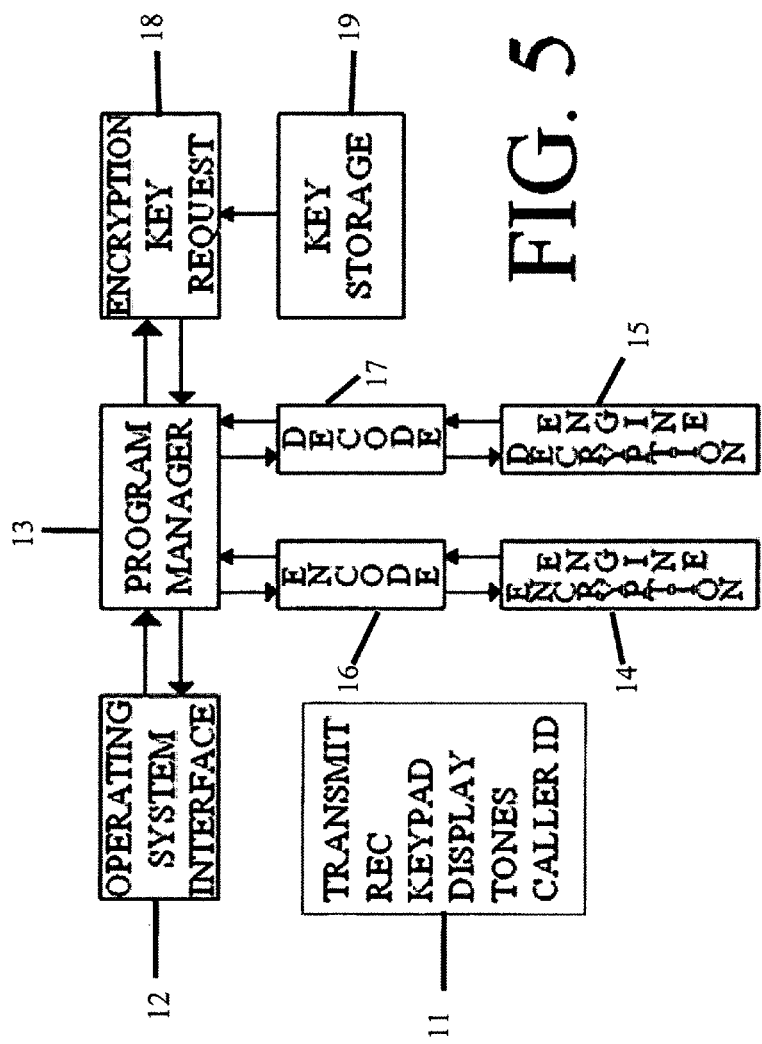

SECURE TELEPHONE DEVICES, SYSTEMS AND METHODS

CROSS-REFERENCE TO RELATED APPLICATIONS

This application claims priority to U.S. application Ser. No. 12/592,488 filed on Nov. 25, 2009 and U.S. Provisional Application Ser. No. 61/200,288, filed on Nov. 26, 2008, the complete disclosures of which are herein incorporated by reference.

BACKGROUND OF THE INVENTION

1. Field of the Invention

The present invention relates to securing voice communications and more particularly to securing cellular telephone communications utilizing cryptographic keys and algorithms, and further relates to securing telephone communications with a cryptographic key and algorithm exchange system.

2. Brief Description of the Related Art

Communications may be made through the implementation of a variety of technologies that are used to enable signals to be transmitted from one point to another. Some of these technologies include, for example, analog, cellular and voice over internet protocol (VoIP). Traditionally, analog telephone service involves an analog signal that is measured in volts and its frequency in Hertz (e.g., Hz). Telephone communications also may involve the transmission of digital signals which are in binary form. Analog signals may be converted to digital signals through modulation and digital signals likewise may be converted to analog signals through demodulation. Another type of technology for telephone communications involves VOIP, which utilizes packet switched networks to send and receive data transmissions. Internet protocol (IP) may be used, and generally, this process involves the switching of the analog signal (voice) to a digital format signal, and then, compression/translation of the signal into IP packets which are transmitted over the Internet. Cellular telephones generally involve the relaying of radio signals from a cellular device (e.g., a cellular telephone) to a low powered transmitter (i.e., where the maximum power radiated in any given direction usually is less than 50 watts). The signal is communicated from one transmitter to another, and ultimately, to another cellular device (e.g., another cellular telephone). For example, many of the radio signals used in connection with cellular telephones generally have frequencies in the upper 300 MHz range to about just below 2000 MHz.

Securing communications has become an important issue. In many instances, telephone communications may be intercepted. Though a digital signal communicated from a cellular telephone may sound something like the noise of a fax machine, there are devices that may decode the signal so that the contents of the communication may not only be intercepted but also may be discerned. Law enforcement may be provided with technology that permits the interception of telephone signals, but others, desiring to unlawfully ascertain the content of a communication also may use intercepting devices to breach privacy among communicating users.

VOIP communications may be susceptible to interception. One type of attack on data that is communicated over the Internet (as in a VOIP communication) involves a Man-In-The-Middle Attack which refers activity involving the intercepting of the connection between a computer and a device (such as, for example, wireless router) that is providing the connection. For example, this type of attack may enable a hacker to collect the information transferred and then replay the data on another computer in order to ascertain its contents. Another type of interception of Internet traffic is known as eavesdropping which generally involves the use of sniffer software to steal data that is being transmitted over the network. A sniffer is the term for a an application or device that is designed to read, monitor, and capture network data. Communications, including telephone communications, are susceptible to methods and equipment that are designed to intercept and obtain data. Attempts have been made to secure data transmissions. One type of security system involves the use of keys and encryption of data.

There are three basic types of cryptographic key management systems. The first is known as symmetric or secret keys. These are the most secure form of keys and rely on the same preset secret key to be at both ends of the communications. The next system is a computed key. Computed keys generally use a secret seed key and therefore have the same key management issues as a secret key. The last key management system are public keys. The most common implementation of public keys is called Public Key Infrastructure (PKI). There are serious drawbacks to the PKI system, mostly the fact that the key exchange may be intercepted and the encrypted data compromised. Secret keys do not have the problem of interception since the keys are generally not distributed using the same communications system as the data. Secret keys can be combined with computed keys.

The problem with secret keys is that they are preset. That is, both ends of a communication must already have the keys in order to encrypt or decrypt and access the data. This means that both ends of the communications must already know each other to the extent needed to arrange keys in advance. This is not practical on the Internet or other live transaction systems or ad-hoc systems such as telecommunications (line, cell or satellite phone) where encryption for online purchases, online banking and just general privacy issues is made on an as-needed, when-needed basis. For this reason, PKI is the most popular encryption method for live transactions. In addition, there is a large cost to managing secret keys whereas these costs do not exist with public keys.

There is a further problem in that most cryptographic algorithms, and, sometimes implementations of the same algorithms, are not compatible with each other. For example, the legacy encryption algorithms known as DES is not compatible with the currently favored encryption algorithm AES. This means that users who have older equipment/software using DES cannot communicate with users who have newer equipment/software using AES, regardless of the keys.

For example, VOIP communication systems may use public key cryptography, such as, for example, Diffie-Hellman ("DH") key agreement method. A public key infrastructure (PKI) allows users to securely exchange data over the Internet through the use of a public and private key exchange pair. However, this has drawbacks, as discussed. In some instances, commercial secure phones may augment a DH exchange with a voice authentication digest which even may be combined with a hash commitment at the inception of the key exchange. Voice authentication digests, for example, may involve two users desiring to communicae who exchange short strings verbally in order to authenticate their connection. Implementation of this authentication requires an agreed on cryptographic hash. This method may be an alternative to using a PKI to authenticating the DH exchange. However, there are drawbacks with the combined voice authentication digest type systems, such as, failure of a user to execute the voice authentication procedure, calls to voice mail servers or other machines including those, for example, requiring menu selection options, that cannot execute the voice authentication procedure (such as when a phone is unattended).

US patent application 2007/0157026 discloses a method and system for key management in voice over internet protocol (VOIP). The '026 application attempts to provide a method and system that may be implemented over the Internet using VOIP protocols, SIP, RTP and SRTP, and involves a shared secret value that is cached and re-used later to authenticate a long series of session keys for a number of separate secure phone calls over a long period of time, without the need for voice authentication. The '026 method and system appears to calculate one-time keys based on a "seed" value that was saved, and involves users that utilize the same cryptographic algorithm.

A need exists for a method and device that can provide secure telephone communications for users desiring to make secure calls through cellular, internet, analog or other telephone communication systems, where the secure telephone system may be used independent of the carrier or phone service provided.

SUMMARY OF THE INVENTION

According to preferred embodiments, secure telephone communication systems, methods and devices are provided so that users may make secure telephone communications, including receiving and transmitting voice communications.

According to a preferred embodiment, a cell phone is the communication device, and preferably, the cell phone is configured with instructions contained in software that is stored on the cell phone. The software may be provided with the cell phone operating system, or may be added subsequently.

According to an alternate embodiment, a server implementation is provided, wherein the telephone communications are handled through an exchange server.

According to some embodiments, it is an object of the invention to provide secure telephone communications even between parties who previously did not know one another. For example, according to preferred embodiments, the method, system and apparatus are designed to facilitate telephone communications where the security of secret keys may be maintained while still allowing as-needed, when-needed, transactions between parties that previously did not know each other.

According to one embodiment, the secured telephone communications are provided between telephone devices that are configured with the security system, and therefore may communicate secure transmissions between the configured telephone devices. A plurality of telephone devices may be used in connection with the system so that a number of users may communicate with each other using secure communications transmissions and receptions.

According to preferred embodiments, the secured communications may be provided to secure communications between secure telephone devices, or groups of secure telephone devices.

According to another embodiment, an exchange server is provided. The exchange server is provided to encrypt and decrypt communications. According to a preferred embodiment, the secure telephone communications may take place between users of telephone devices that are not using the same encryption algorithm or even the same telephone device carrier, such as, for example, in the case of a cell phone carrier. In addition, the embodiments that utilize the cryptographic exchange server permit users of the telephone devices to engage in secure communications with other users even where the respective cryptographic keys of a user are not known or shared with another user.

Embodiments of the invention may provide enhancement of security with the use of computed keys, salts or any other method known in the art. Further, the method, system and apparatus may be implemented, according to preferred embodiments, where both ends of a communication between users (which may carry out communications with their respective telephone devices) may be utilizing cryptographic communications that may be incompatible or compatible cryptographic algorithms and the communicating users (and the users' respective telephone device) may still be able to communicate effectively with each other (for example, with the other user's telephone device).

Further, according to preferred embodiments, the telephone communications may be carried out so that they are both secure and transparent to the end users. Alternatively, other options may provide for user interaction or feedback, however, if that is desired.

Preferred embodiments of the method, system and apparatus utilize an exchange which is configured to manage transactions between users or components, such as telephone conversations. The exchange is configured to facilitate secure telephone communications between users regardless of the compatibility of the cryptographic means employed by each user.

Embodiments of the invention may include an exchange with a database of preferred cryptographic algorithms and keys for users and their telephonic devices. The invention also may provide for the ability to encrypt and decrypt encrypted data using any method know in the art.

Embodiments of the invention also may provide the ability to translate by decryption and re-encryption any key or encryption algorithm into any other known in the art. Accordingly, a requesting user may use one type of key or encryption algorithm when communicating with another user, such as, for example, a target user that is designated to receive the telephone call, even where that target user uses another type of encryption key or algorithm.

Embodiments of the invention may feature a means of providing non-repudiation certification.

Embodiments of the invention may feature a means of providing notice of non-repudiation to users involved in a transaction or to components involved or associated with a transaction or transacting user. For example, according to embodiments where telephone devices are assigned or designated as being part of, or members of, a group, then users of the group may be provided with a notice of non-repudiation. According to other embodiments, anyone using the system with the same or connected servers may be non-repudiated.

It is an object of the invention to provide a method, system and device that implements a secret key encryption mechanism that is useful in connection with securing telephone communications.

It is another object to accomplish the above objects for standard cell phones.

It is another object to accomplish the above objects utilizing VOIP as a transmission medium through which signals are communicated and securely managed.

It is another object of the invention to provide a method, system and device that may comply with FIPS 140-2.

According to preferred embodiments, software is provided, and preferably, operates at the application layer. Preferred embodiments also may be constructed to isolate system dependencies into a library.

According to preferred embodiments, the method, system and devices may be configured for utilization with a variety of operating systems, such as, for example: J2ME; SYMBIAN (Used in Euro, Middle East, Africa); BREW; Windows Mobile 5 (6.x, . . . ) and Windows CE; and Linux.

It is another object of the invention to provide a method, system and device that may provide application layer encryption for telephone devices, including, for example, cellular telephones.

According to preferred embodiments, the method may involve implementing instructions through software that is provided on a telephone device, such as, for example, a cell phone, to take control of the audio stream within the cell phone. In some cases, the audio stream is provided in a digital format that may be handled with the software and the implementation of instructions that take control of the audio stream. In other cases, an additional instruction is implemented through software so that the audio stream is converted by encoding it or decoding it so that the audio stream is transformed into a compatible format that may be read and processed. Preferably, the encoding/decoding component or components allow the secure telephone communication systems to be utilized with analog signals which may be encoded as digital information, processed, and then decoded to provide an analog signal that may be transmitted.

According to preferred embodiments, the method, system and device may be configured to utilize AES encryption software, and preferably, an AES source code.

BRIEF DESCRIPTION OF THE DRAWING FIGURES

FIG. 2 is a flow diagram illustrative of an exemplary embodiment of a secure telephone device, system and method in accordance with the invention, where an exemplary preferred embodiment of the logic flow for an outgoing call is illustrated.

FIG. 3 is a flow diagram illustrative of an exemplary embodiment of a secure telephone device and method in accordance with the invention, where an exemplary preferred embodiment of the logic flow for the conversion of a standard call to an encrypted call is illustrated.

FIG. 4 is a flow diagram illustrative of an exemplary embodiment of a secure telephone device and method in accordance with the invention, where an exemplary preferred embodiment of the logic flow for an incoming "call waiting" call is illustrated.

FIG. 5 is a flow diagram illustrating a preferred embodiment of the method, system and device configuration for a secure telephone communication implementation of the invention.

DETAILED DESCRIPTION OF THE PREFERRED EMBODIMENTS

Figure 1:
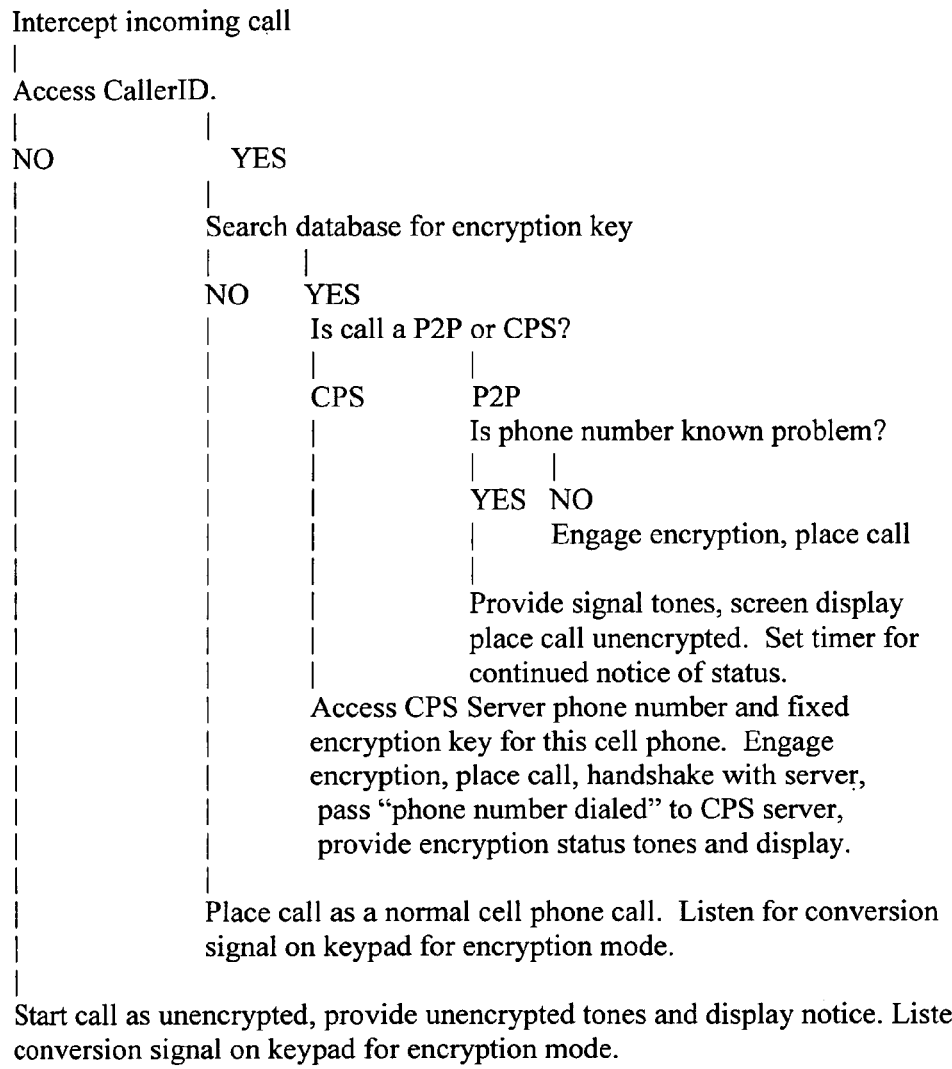
FIG. 1 is a flow diagram illustrative of an exemplary embodiment of a secure telephone device, system and method in accordance with the invention, where an exemplary preferred embodiment of the logic flow for an incoming call is illustrated.

According to a preferred embodiment, a method, system and device are provided for carrying out secure communications using telephone devices. According to a preferred exemplary embodiment, the system and method may be used with a cellular telephone device. The cellular telephone device has an operating system that is stored on a storage component or other media of the cell phone that handles the operations of the cell phone. According to the cell phone peer to peer embodiment, the cell phone is configured with software that implements instructions in conjunction with the operating system of the cell phone. Preferably, the implementation of the instruments that manage the secure communications of the telephone operate in conjunction with cell phone's operating system and are configured to operate at the application layer, preferably with only small operating system interfaces. In some embodiments, the operating system may be provided with the software that manages the implementation of the secure communications. In other embodiments, the software that implements secure communication is provided separately from the O/S. According to preferred embodiments, the configuration of the software may enable a large portion of the code to remain the same for each cell phone. According to preferred embodiments, the software that is configured to implement the instructions for secure communications may be implemented as small functions, and preferably may have operating system and hardware dependencies isolated into their own library. According to preferred embodiments, the software and libraries may be stored on the cell phone device that is to be used for carrying out secure communications.

According to a preferred embodiment, the method may be configured as a peer to peer (P2P) cell phone system, where one or more cell phones are provided with the instructions to carry out the operations of the method. The peer to peer (or P2P) embodiment may be configured so that it does not require a server. The peer to peer system may prove advantageous where the secure communications are to be carried out between a number of users, such as a small group. For example, a user or the user's telephone device may be assigned to one or more groups so that user and the user's respective telephone device may engage in secure telephone communications with one or more other users of the group (or groups) to which the user or user device is assigned or otherwise has membership.

According to preferred embodiments, a telephone device may be configured to operate as a peer to peer secure telephone. Another preferred embodiment includes a telephone configured to operate in conjunction with the cryptographic exchange system. Another alternate embodiment provides a telephone device that is configured to operate as either or both, a peer to peer secure telephone or a telephone in association with the cryptographic exchange system. Optionally, or in addition thereto, the telephone devices may be configured to have (or retain) the ability to conduct communications that are not secured through the peer to peer or exchange systems. For example, according to some embodiments, the operator of the telephone device may be provided with the option to select the type of communication that is to be made (e.g., secure peer to peer, secure exchange system, ordinary call without the security of either system).

According to another embodiment, a cryptographic switch or cryptographic exchange server (CES) is provided. The cryptographic exchange server (CES) embodiment may be implemented for a number of telephone devices. The method may be carried out with software that is configured with instructions that are provided to implement steps to secure the communications between telephone users. For example, according to preferred embodiments, the software provided within the cell phone for the P2P system may be similar or identical to the software provided within the cell phone to implement the CES system, however, with the configuration settings being changed to point to the CES server. For example, in the preferred CES implementation embodiments, the cryptographic data that is to be verified through the exchange instead of only among the telephone devices, is directed to take place between a telephone device and the exchange server.

According to a preferred embodiment, the P2P cell phone software is configured to operate at the application layer within the cell phone operating system. The secure communication software implements instructions to interface with the channels through which cell phone functions take place. One way of carrying this out is by making connections to the operation software for the purpose of intercepting the "speaking" and "listening" channels. The connections are made consistent with the operating system of the cell phone. For example, according to one embodiment, the telephone device may be configured so that its operating system may direct the input and output of the telephone communication signals or data to a channel on which the speaking or listening occurs. According to some embodiments, the connections that are made to deliver information so that the software instructions may be implemented to process the information are made so that the input and output channels are intercepted. For example, where the operating system provides for a wedge (or another operating instruction that permits the auditing, interception or redirection of the input or output of the communication) that may be utilized so that the software may implement instructions for carrying out procedures to process the information. According to other embodiments, the cell phone may have other existing mechanisms, including those built into the hardware or operating software that allow for this feature.

According to preferred embodiments, the software implements instructions to carry out a secure authentication routine for the telephone communication. The method and system may be utilized in conjunction with a variety of cell phones from different manufacturers and including different models. The cell phone preferably has sufficient processor power and memory to permit software to be stored on the cell phone so that the instructions may be implemented. According to preferred embodiments, the cell phone is utilized with its existing hardware and operating system. Alternate embodiments provide a cell phone configured with the software and instructions to carry out the secure communications according to one or more of the embodiments described herein. Alternate embodiments include providing software to implement the secure communications by porting the software to existing cell phones, including those already in use on a carrier or service provider's line or network.

Another object of the invention is to provide a secure method and apparatus for telephone communications, where users may employ telephone devices without the need for those users to have the same carrier. Preferably, the secure communications may be carried out without the need to account for who the carrier is. For example, one caller may be on a Verizon network or operated telephone and another caller on a Comcast network or device. Embodiments may be configured so that one or more types of devices may securely communicate with each other, such as, for example, a line telephone and a cellular telephone. Preferably, the secure communications is carried out utilizing a digital channel. For example, if a digital channel is available then the data will be transmitted over the digital channel using any means known in the art, such as, for example, VOIP. In order to facilitate communications, encoding and decoding of analog signals to other forms, such as digital signals which are able to then be encrypted and decrypted in accordance with the methods of the present invention, may be employed in connection with the devices and telephone networks used.

The devices, methods and systems may be configured to provide secure telephone communications that may be accomplished independent of the cell phone carrier or service provider. According to preferred embodiments, the method, system and devices may provide secure telephone communications between users of telephone devices that are incomparable. For example, configurations may be implemented to secure telephone communications where one caller may be in Europe using an incomparable cell phone system while, on the other end of the call, may be a user in the United States.

According to preferred embodiments, the software may be configured with instructions for implementing operations in one or more modes, such as, for example, any of the following modes: 1. Normal (cell) phone call; 2. Encrypted (cell) phone call using point to point encryption. (P2P); 3. Encrypted (cell) phone call using the Cryptographic Exchange Server. (CES); 4. Both P2P and CES automatically switched depending upon the number dialed.

Optionally, the user may be provided with the ability to make selections and determine whether, and how, the call encryption will be handled (e.g., by choosing one of the modes).

The P2P embodiment may be used without a server, and, according to preferred embodiments, implements instructions from software provided on the telephone device of the user. The P2P cell phone preferably is configured with software that may be provided in a number of modules. Though a number of modules are described, the software may be configured to have the features and operations of the modules required to carry out secure communications, regardless of whether provided as separate modules or implemented as a single item, including, for example, in conjunction with the operating system of the telephone device. According to a preferred embodiment, a listening intercept and injection (LII) module is provided. The LII module is configured with instructions for intercepting all incoming signals. The LII module preferably is also configured to contain instructions for processing the intercepted signals cryptographically. According to preferred embodiments, the LII module is configured with instructions to implement the injection of the result back to the operating system for delivery to the speaker system. In the P2P embodiments, the cell phone processor is instructed to implement processes (e.g., routing data from a channel) so that the incoming signals are intercepted. The LII module may be configured to identify inputs or incoming signal activity so that the receipt of an incoming signal or a response of a user to an incoming call activates the interception of the signal. Accordingly, the LII may be activated to implement interception of the listening channel. A cryptographic process is carried out on the incoming signals, and the result is then passed along for delivery through the operation of the cell phone operating system that provides the output to the cell phone speaker. Where a signal needs to be decoded/encoded for cryptographic processing, that may be done through the application of a decoding/encoding component.

Preferably, a talking intercept and injection (TII) module also is provided. According to preferred embodiments, the TII module is configured with instructions for implementing the interception of all outgoing signals, processing them cryptographically and then injecting the result back to the operating system for delivery to the transmission system.

According to preferred embodiments, a cryptographic key escrow (CKE) module is provided. The CKE module may be adjustably provided to cooperate with the operating system of the telephone device, such as, for example, the operating system of a cell phone. The CKE module is configured with instructions for managing cryptographic information, such as, for example, encryption keys. According to one embodiment, CKE module implements a key escrow system that makes use of the telephone directory feature of the cell phone, which preferably may be done through or in association with the cell phone operating system, to store data. Encryption keys may be ASCII(ified), such as, for example, by processing using a reduced uuencode or mime algorithm. A preferred usage of the ASCII(ified) encryption keys is to process them in order to make the keys fit within the storage container of a telephone directory lookup. According to some embodiments, the key may be processed so that it is split into two or more parts in order to allow the key to fit within the allocated directory storage area. Where, for example, a key is stored in the telephone directory of the telephone device, then for some embodiments, preferably the CES embodiment (where a cryptographic exchange server is employed), the CKE module may be configured with instructions for storing the key under a lookup name, such as, CRYPTOKEY1, CRYPTOKEY2 and so on, until the entire key is stored. According to a preferred embodiment, where the telephone device is configured for use in conjunction with the P2P secure system, the key is associated with the entry in the telephone directory. Preferably, according to one exemplary implementation, the name in the telephone directory may be designated as whatever the user entered for the name and phone number of the entry with the addition of additional characters at the end. For example, if the user enters a new user of "Joe Who" then the user will enter a key for Joe Who in the form of a new entry in the name of "Joe Who Key 1". According to a preferred embodiment, the keys may be entered and managed by the cell phone using the method the cell phone employs to allow phone contacts to be managed.

According to an alternate embodiment, the cryptographic key management is managed with a module that permits the generation, designation and storage of keys in a location that is separate from the directory of contacts. For example, according to preferred embodiments, the key storage location may be associated with or linked with the directory storage location of the contacts.

The CKE module may be implemented with instructions that handle the secure keys so as to permit the telephone user to input a particular key that may be provided to the user. For example, according to preferred embodiments, new keys may be distributed to a user by paper, fax, email or any other method known. In addition, a key book may be provided for distribution, and may be redistributed or change periodically. For example, the key book may provide changes to the keys to correspond with certain events, such as, for example, days, hour of call, or provide different keys to be used over different times or conditions.

According to preferred embodiments, the methods for securing telephone communications preferably utilize an encryption system. The cell phone device preferably is provided with software that implements an encryption component. This may be done in connection with one or more modules, such as, for example, the LII or TII modules. According to one example, a preferred encryption system is the AES encryption system, although, according to alternate embodiments, encryption algorithms and methods for generating keys (other than AES) may be used (such as, e.g., DES, 3DES and the like). The encryption component (or encryption/decryption component) provides instructions so that the processor carries out the AES algorithm in conjunction with the key to provide encryption and/or decryption of the telephone communications. According to a preferred embodiment, AES cipher is specified as a number of repetitions of transformation rounds that convert the input plaintext into the final output of ciphertext. Each round consists of several processing steps, including one that depends on the encryption key. A set of reverse rounds are applied to transform ciphertext back into the original plaintext using the same encryption key. The AES may be employed in conjunction with the LII module to apply the algorithm to the information, such as the data, intercepted by the LII module. The AES also may be employed in conjunction with the TII module to encrypt the outgoing communication information. The AES algorithm is sometimes referred to as Rijndael algorithm. A complete description of the AES algorithm may be found at www.csrc.nist.gov/publications/fips/fips197/fips-197.pdf, the disclosure of which is herein incorporated by reference. Accordingly, alternate algorithms may be used in connection with or in place of the exemplary AES algorithm.

A cryptographic key lookup system may be implemented so that the proper cryptographic keys are delivered to the encryption and decryption components of the system so that the encryption/decryption functions may be implemented when they are called upon. For example, according to a preferred embodiment, the software may be configured with instructions to implement a function that looks up the appropriate key that is to be used. One example is a key lookup associated with a particular telephone number or directory entry. Another example is a key associated with a group, such as, for example, a group of contacts or group of numbers.

According to a preferred embodiment, the system preferably includes an outgoing call intercept (OCI) module for managing the association between a number of an outgoing call and encryption data. For example, according to a preferred embodiment, the OCI module is configured with instructions to intercept an outgoing call and ascertain the number of the outgoing call and compare that number with cryptographic data to see if an escrowed key exists for that phone number. The cryptographic data may be the escrowed key corresponding with the telephone number of the outgoing call. If the OCI module successfully identifies the escrowed key, the then the processor is instructed to automatically place the call as a cryptographic call with full encryption. The OCI module preferably is configured to operate in conjunction with the operating system of the telephone device, so that the operating system output data relating to the placement of an outgoing call may be intercepted. According to preferred embodiments, the outgoing call intercept routine preferably may be configured with instructions that are similar to the incoming call intercept functions. According to alternate embodiments, where a telephone device operating system is configured to provide different methods for handling incoming calls and outgoing calls, the OCI module may be configured to handle outgoing calls, and another module, provided separately from, or as part of, the OCI module, may be implemented for handling incoming calls. For example, where a telephone device includes multiple incoming call capabilities, such as, for example, two different telephone numbers on the same telephone device, separate OCI implementation may be configured for incoming and outgoing calls, or for each incoming and outgoing call corresponding with a telephone number.

In the case where the OCI module is configured to handle only outgoing calls, then an incoming call intercept (ICI) module may be provided for handling incoming calls. The ICI module is configured with instructions for implementing the interception of an incoming call. Preferably, the ICI module may function similar to the OCI module, discussed herein. For example, the ICI module may be configured to implement a search to determine whether the escrowed key system contains a matching key. If so then, according to preferred embodiments, the call may be automatically received as a cryptographic call with full encryption. Preferably, where the exchange server embodiment (CES) is utilized, the system supplies the same key. This may be done in the same manner as described herein in connection with the OCI features. The ICI may or may not be implemented as the same program as the outgoing call intercept. For example, whether the OCI and ICI programs are implemented together may depend on the telephone device operating system requirements.

According to embodiments where the exchange server is utilized in connection with the cryptographic processing, preferably, the same key associated with the user or that user's telephone device is supplied to the cryptographic exchange server. According to preferred embodiments, the telephone device, or certain telephone numbers, contacts or groups may be configured to be locked on to the server when the telephone device is activated to receive and send signals.

Preferably, a configuration management component (CMC) feature is provided for managing the configuration options for the placement and receipt of telephone calls. According to one embodiment, the CMC is configured to implement and apply the configuration options. For example, in the case where the user is assigned a telephone device (e.g., as part of a group), these configuration options may be assigned to the telephone device. In accordance with other embodiments, where the user may select configuration options, such as, for example, the option to make or receive a secure call, then the CMC may be configured to store and remember the configuration options and apply them. For example, if the user has a telephone device that is configured for CES modes or P2P and CES modes, then the CMC component may implement locking of the system into the CES mode where an exchange server is utilized. The CES mode may be provided as a default mode, if desired. Another example is that if the system is able to use both CES and P2P modes, then the CMC may be configured to determine in which manner the phone will operate for each number called. According to preferred embodiments, the CMC component may be configured to implement management of subsequent feature upgrades.

According to one embodiment, the system may be configured to implement special activation management (SAM). The SAM feature allows for an existing phone call to be converted into a cryptographic telephone call. Preferably, the SAM feature may be used if one of the two phones does not perform callerid correctly. For example, according to a preferred embodiment, the SAM feature may be implemented to operate during an ongoing unencrypted call. One implementation of the SAM feature may be to monitor the keypad for inputs. If the number 999 is pressed then the SAM feature is activated. The activation of the SAM feature implements the presentation to the user of an option of cryptokeys to select, and the call may be converted into a crypto call. According to a preferred embodiment, once a call is a crypto call, it cannot be switched off. Preferably, the phone will remain active in the secure cryptographic mode until one or more designated conditions occur. For example, the system may be configured to actively maintain the secure cryptographic mode until one of following conditions occurs: the signal is lost, the connection is ended by the remote phone, the phone operator hangs up or a timeout condition exists where key management does not occur within the specified time. Another option is that the user is provided with the ability to make configuration settings, and the time out value may be user set in configuration management features through the user of the CMC module component. According to preferred embodiments, there may be a window of latency while the operators of both phones switch on crypto, select a key and wait for the other user to do the same. The user preferably may maintain the call until the connection is established, or, according to some embodiments, until a message appears indicating the security condition has not been met.

The encoding/decoding component may be implemented to allow digital access to analog signals, such as voice or radio signals. The encoding component can take an analog signal (e.g., voice or radio) and encode the analog signal so that it is turned into a digital signal that may be encrypted. The encoding/decoding component also may implement encoding so that the encrypted data, now digital, may be encoded again to transmit the data over an analog radio signal. The encoding component may be provided for converting the audio stream into a format that can be encrypted. In some cases, the telephone device may already provide and utilize an audio stream that functions in a format, such as, for example a digital format, which may be encrypted without further conversion of the stream.

A decoding component may be provided for converting the decrypted but still encoded audio stream into an audio stream that is compatible with the cell phone operating system. Optionally, the encoding and decoding may be implemented with an encoding/decoding component that is designed to be implemented to convert a signal that is analog or is otherwise not in a preferred digital format.

FIG. 5 illustrates a schematic diagram of an exemplary embodiment of a secure telephone device in accordance with the invention. A function input mechanism 11 is shown, which for example, may be a keypad, on screen key display, remote input device or combinations thereof. An operating system interface 12 is provided to provide functions of the secure telephone system in conjunction with the phone's operating system and the channels utilized by the operating system and phone components (e.g., speakers, microphones, etc.) so that the secure signal data may be intercepted processed and delivered to a respective input or output of the phone (e.g., speaker, transmitter). The program manager 13 may carry out the implementation of the functions of the intercepting and processing of secure communication management. The program manager 13 may operate in conjunction with the encryption engine 14 to deliver or otherwise make the data stream or signal available for cryptographic processing. The encryption engine 14 may receive a signal or data and encrypt that data for delivery to a channel such as, for example, an output or transmission component of the telephone. The program manager 13 may implement a procedure that invokes an encryption key request 18 which may be carried out through an association between the target to be called or callerid and an associated key from a key storage location 19. The program manager 13 may, for example, provide or make available the key so the encryption engine 14 may process the data and encrypt it so that a secure cryptographic call may be placed. Similarly, a decryption component, such is the decryption engine 15, may be employed in connection with the program manager 13 to provide decryption for signals and data, such as incoming calls received. The callerid other association (e.g., manual or user selected) may be utilized in connection with the encryption key request 18 and may rely on the key storage 19 for ascertaining a key for the cryptographic processing of an incoming call. Optionally, where an analog signal is being managed, the encoding component 16 and decoding component 17 may be utilized to transform the analog signal to a digital signal that may be cryptographically managed and processed to provide secure telephone communications. The digitally processed signal may be returned to an analog signal through the implementation of the encoding and decoding components 16, 17, respectively, so that the analog signal may be received, processed and managed in accordance with the secure communications management system, and an analog signal may be transmitted.

The following examples are illustrative of preferred embodiments of the system, method and telephone device for carrying out secure telephone communications.

Example 1

Placing a Call

The secure software is implemented on the telephone device to remain active. Preferred embodiments activate the secure software at all times when the telephone device is operating. When a call is made the secure software intercepts the number dialed or accessed via the contact directory and intercepts the SEND command. If the number is flagged as having a cryptographic key associated with it, then the call is automatically dialed as a cryptographic phone call. There is no reason to provide the customer with an option to disable the encryption for that call since, according to a preferred implementation, all phone numbers associated with crypto keys are to be placed as cryptocalls. If the phone number is not a flagged call then the cell phone system operates normally and the call is placed unencrypted. If the number to be called is flagged then the system retrieves the cryptokey and activates the secure implementation features. Once activated, the system makes the decision of if the call is a CES or a P2P call. If the call is a P2P call, then the number is dialed and encryption is started so that there is no window in which the call is not encrypted unless the phone number is flagged as a "problem number". If the number is flagged as a problem number, then the call starts as a standard unencrypted call and notifies the caller of such. For example, notice may be given on the display screen but must always also be given via audio signal. For example, the Morris Code for SOS may be signaled to let the user know the call is not encrypted, or alternatively, another form of notification is provided, such as a prerecorded voice signal. According to one exemplary option, if the call is a cryptographic call but operating in unencrypted mode then the audio signal may be given every 30 seconds so that it is heard on both ends of the call.

Under a preferred operation, the receiving phone is instructed to ascertain that a received call is a crypto call and be able to initiate a routine to lookup the proper encryption keys using the CALLERID feature (e.g., by association of the caller number of the incoming CALLERID data with the stored cryptographic key associated with that number). If for some reason the CALLERID function is not operating, then the user may be provided with the ability to place the call as a PROBLEM NUMBER call. A phone number may either be permanently associated as a Problem Number call or the user may flag a one time use of the feature. This will allow the user to tell the operator at the other end to switch to crypto mode and identify themselves so the correct key is selected. According to the exchange server (CES) embodiments, the problem number calls would not need to be handled in this manner, since for CES calls, an automatic handshaking system resolves the issue for CES calls.

Once a secure cryptographic call has engaged full encryption, then a notice is displayed on the display of the telephone device (or other associated device) and an audio tone signal is given. For example, a tone designation may be a series of ascending tones for a CES call or a series of descending tones for a P2P call.

Example 2

Receiving a Call

When a call is received the cryptographic telephone software intercepts the call and the ACCEPT key. The callerid is examined by the software instructions that are implemented to determine if it the callerid is a known cryptographic phone station. The callerid number is used as an index to retrieve the cryptographic key. If the phone number displayed is flagged as a Problem Number but callerid is received then the Problem Number routines are ignored. If the callerid is not present, then the call is handled as a normal (unencrypted) phone call with the exception that the user may activate the cryptographic telephone feature upon selection of a valid crypto key. Note that there may be a race condition where the CALLERID number is not available when the call signal is received. This is not normally a problem within the USA, but it may happen. If this happens the call is dealt with as a normal (unencrypted) call.

Example 3

Ongoing Unencrypted Call

If during an ongoing call the user presses the 9 key three times in quick succession then the call undergoes conversion to a crypto call. The user is requested to select a crypto key and the encryption functions are engaged.

Example 4

Ongoing Encrypted Call

According to this example, there are no options to proceed to an unencrypted mode once a call is operating in crypto mode. The user can only terminate the call.

Example 5

Figure 6:
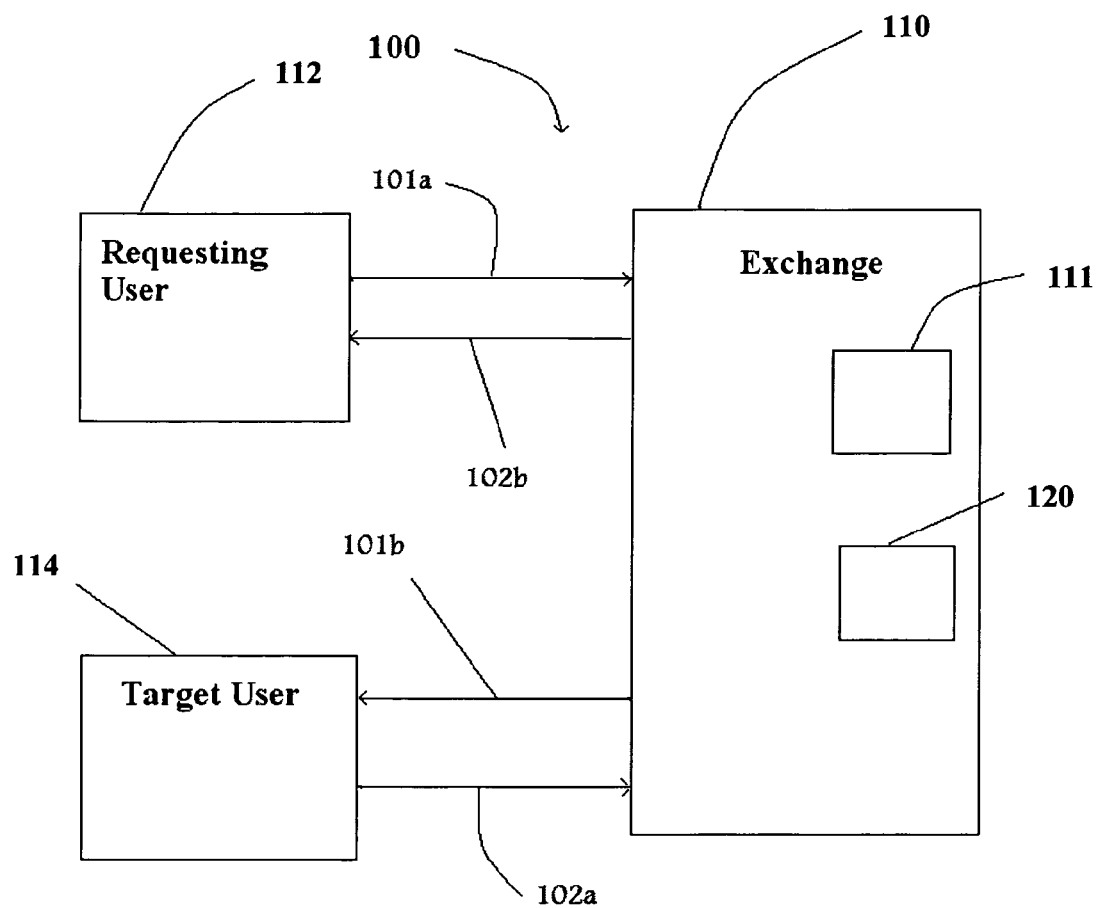
FIG. 6 is a flow diagram of a preferred embodiment illustrating an exchange component in an arrangement with communicating components shown as telephone devices.

An example of a preferred embodiment showing an implementation of the invention is illustrated in FIG. 6. An exchange component 110 is illustrated. The exchange component 110, according to some embodiments, may include a processor 120 and storage media provided with, or according to alternate embodiments, may be separately provided and linked for communication with the processor 120. For example, according to some embodiments, the exchange may be configured as an exchange component including instructions in the form of software stored on storage media, where the storage media is linked with a processor so that the processor is instructed to carry out management of communications and transactions between users and components managed by the exchange. The exchange component 110 preferably has at least one storage component 111 for storing instructions. The instructions may comprise software that is configured with instructions to instruct the processor 120 to handle requests received by the exchange component 110, such as, for example, requests from a requesting component 112. The exchange component 110 preferably is configured to communicate with telephone devices. The requesting component 112 may, for example, be a client or computer, and preferably according to a preferred embodiment, is a telephone device that has a processor and software to manage the operations of the processor, and which seeks to communicate with a second client or component, such as the target user 114 which, according to a preferred implementation of the exchange system, may be another telephone device. A user desiring to make a telephone call may operate a device or requesting component 112, such as the user's telephone device, to transmit a request to the exchange component 110. According to a preferred embodiment, the user makes a call and the transmission of the call is communicated to the exchange component 114. The requesting component 112, which in this example is the user's telephone device, may be operated by a user that makes the request, or may be automated to make a request upon a condition.

For example, an automation mechanism may be provided and linked with the telephone device of a user to be responsive to a condition, so that when a designated condition is sensed or experienced, such as, for example, the issuance of a request, the exchange operates to authenticate the communication and/or user or user device. Alternately, according to other embodiments, the exchange may be configured so that when a user or component, such as the user's telephone device, triggers a condition or event, a communication from the first component, such as the user's telephone device (which is identified as the requesting component 112), is issued and received by the exchange. The exchange may be configured to transact or communicate with one or more other user components as a result of receiving the request from the first user. For example, where a user engages in telephone communications with a plurality of other users, the exchange may handle the security of the communications between the plurality of users.

The second client or component 114 according to a preferred embodiment may be a target component 114, as is illustrated in FIG. 6. According to a preferred embodiment, the target component may be another user using a telephone device. The second component or target component 114, such as the second user's telephone device, according to one example, may represent the target of a requesting component 112, the first user's telephone device. According to a preferred embodiment, where the requesting component 112 is a user's telephone device, the telephone device may be configured with software to implement a request for a communication with another component (e.g., the telephone device of another user). In this example, the user's telephone device (which is the requesting component 112) provides a communication or request (a telephone call) intended for another user through that other user's telephone device (the target component 114). The exchange system 100 is shown in FIG. 6 including a telephone device which is represented as a first component or requesting user 12, a second telephone device represented as a second component or target user 14 and an exchange illustrated as the exchange component 10. In the example illustrated in FIG. 6, communications or transactions 101a are routed from the first telephone device (the requesting component 112) to the exchange component 110.

The request 101a may be issued from the first user's telephone device and includes the identity of the requesting user 112, the confirmation of the identity of the user encrypted using the user's preferred encryption algorithm and key. The user's preferred encryption method may be stored as a cryptographic user profile and associated with that user. Preferably, the profile is stored on the exchange, or in a database accessible to the exchange. The exchange component 110 assigns or associates the communication or transaction request 101a with a unique identifier, which may be a derivation of an algorithm, key or other encryption method, in order to carry out a routine to match and confirm the requesting user 112 credentials through the encryption identity provided by the user with the information of the user database (which is available to the exchange). As discussed herein, the user's telephone device stores the encryption data of that user.

For example, the unique identifier assigned to the request 101a may be based on the identity of the requesting user 112 and the key or algorithm that it uses for its encryption (based on the cryptographic information that is stored in that user's telephone device). The exchange component 110 uses the identifier to undertake providing a cryptographic association with the requesting user 112 that the exchange component 110 may use to manage the communication or transaction of the requesting component or user 112. In this example, the CES embodiment preferably involves the exchange matching the cryptographic information with the user telephone device that initiated the communication. According to a preferred embodiment, a user making a telephone call to another user makes the call using the user's telephone device. The signal is then provided to the exchange, where the exchange authenticates the cryptographic encryption for that user. The exchange then may operate to authenticate the target user to whom the call is intended, and the secure communications may take place with the exchange, and not each user, knowing the security encryption data of each communicating user.

In the illustration of FIG. 6, the exchange component 110 handles the communication or transaction 101a. The communication 101a, for example, also specifies that it is a request intended for target user 114 and contains the identity of the target user 114 (e.g., the initiating user entered the telephone number of the target user 114). According to this example, the identity of the target user may be the telephone number of the target user. The exchange component 110, after authenticating the requesting user 112, retrieves data for the target user 114 and authenticates the target user 114 by communicating with the target user through a connection 102a. For example, according to a preferred implementation, the exchange component 110 communicates with the second user's telephone device in order to authenticate that end of the communication. The exchange 110 uses the key and/or algorithm encryption mechanism that is associated with that target user 114, such as, the cryptographic target user profile (which also may be stored in a database, as described herein in connection with the requesting user). The target user 114 may utilize an encryption mechanism which is unknown to the requesting user 112. However, the exchange component 110 manages the communication or transaction 101a and the target communication 102a, so that both sides of the transaction are authenticated. Once the target user 114 is authenticated, the transaction or communication 101b is then delivered to the target user 114. In accordance with the example illustrated in FIG. 6, neither the target user 114 nor the requesting user 112 require knowledge or identification of each other's key and encryption algorithm. According to preferred embodiments, the cryptographic key information of each user, is stored on that respective user's telephone device, but not the telephone device of other users. The exchange component 110 preferably is configured with the encryption key information for each user whose communications are to be handled through the cryptographic exchange server (CES).

Communication from the target user 114 to the requesting user 112 also may be accomplished in the same manner, if desired. For example, a target user 114 may communicate with a requesting user 112 through a transaction 102a. The transaction 102a is communicated to the exchange component 110, and is handled, as discussed in connection with the transaction 101*a*. The transaction 102*b* may then be communicated to the requesting user 112.

Though the example illustrated in FIG. 6 discusses keys and algorithms, certification means for authenticating the users, such as non-repudiation means, also may be utilized, including, for example, biometric data (such as retinal scans, fingerprints, and the like) as well as passwords. Preferred embodiments are designed to utilize the capabilities of the users' telephone devices. For example, the use of secret keys, secret from the requesting user and the transacting user, may be employed even where the requesting user and transacting user are communicating in a secure transaction. The exchange preferably may be configured to manage secure authentication certifications for each user of the system independent of the security mechanism employed for each other user of the system. In accordance with embodiments of the invention, secret keys may be used for each user, and need not be shared among users for the transactions and communications to securely take place between users of the system.

The exchange may be configured in a number of ways. For example, the exchange may include an exchange component 110 that is linked with or resides on one or more or both the requesting user (or a first component) or the target user (or a second component).

According to an alternate embodiment, at least one user's telephone device may be provided to handle incoming and outgoing communications of that user, and also may be configured to handle the exchange between one or more users, including the user communicating through that telephone device configured with the exchange.

Alternately, the exchange may be configured to reside on a component which is neither a target component nor a requesting component, but is designed to receive communications and transactions between one or more components, such as, for example, a requesting component and a target component. The requesting component may comprise a device, such as, for example, a server computer, a personal computer, a PDA, cell phone, smart phone, or other transacting or communication device. Similarly, the target component may include similar devices. According to preferred embodiment, the requesting and target components are telephone devices through which voice communications may be transmitted and received.

According to preferred embodiments, the telephone communication data is transformed so that the input, for example, from a call or communication being received, is decrypted based on the associated encryption key using the encryption scheme assigned or associated with the incoming call data, such as the incoming call telephone number. According to preferred embodiments, the transformed data that has been decrypted, is then injected back into an audio output channel where it is sent to the hardware component, such as a speaker, where the voice communication may be heard by the target recipient user. The handling of an outgoing call with a telephone device may be similarly accomplished. According to preferred embodiments, the user speaks his voice communication where it is picked up by the microphone. The electronic signal preferably is intercepted and processed where the communication data is encrypted using the key and algorithm associated with the number of the call being made so that the processing will transform the data into an encrypted data signal. The encrypted call data is transmitted though the telephone service (e.g., radio, tower, line) to the target user. When the target user receives the encrypted call data, the target user may use its telephone device to answer the call. Call data received by the target user preferably is intercepted and processed to transform the encrypted call data into a signal that may then be delivered to the speaker component of the telephone device. The user may then carry out communication with one or more other users through telephone devices, where the communication data traveling between users is encrypted and decrypted during the call. Encoding and decoding that may be needed to transform the call data into a format that may be encrypted/decrypted and processed to deliver the data into the channels where encoding and decoding that may be needed to transform the call data into a format that may be processed by encrypting/decrypting and delivering the data into the channels through which the telephone signals are delivered, such as, for example, a speaker (for an incoming transmission) or from a microphone to a transmitter (for an outgoing transmission). According to preferred embodiments, the signal may be encoded or decoded to facilitate compatibility with the telephone operating system (e.g., where an analog signal is involved and is converted to a digital signal and/or where a digital signal has been processed and is to be transmitted as an analog signal). The steps and operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

According to preferred embodiments, the telephone communication data is transformed so that the input, for example, from a call or communication being received, is decrypted based on the associated encryption key using the encryption scheme assigned or associated with the incoming call data, such as the incoming call telephone number. According to preferred embodiments, the transformed data that has been decrypted, is then injected back into an audio output channel where it is sent to the hardware component, such as a speaker, where the voice communication may be heard by the target recipient user. The handling of an outgoing call with a telephone device may be similarly accomplished. According to preferred embodiments, the user speaks his voice communication where it is picked up by the microphone. The electronic signal preferably is intercepted and processed where the communication data is encrypted using the key and algorithm associated with the number of the call being made so that the processing will transform the data into an encrypted data signal. The encrypted call data is transmitted though the telephone service (e.g., radio, tower, line) to the target user. When the target user receives the encrypted call data, the target user may use its telephone device to answer the call. Call data received by the target user preferably is intercepted and processed to transform the encrypted call data into a signal that may then be delivered to the speaker component of the telephone device. The user may then carry out communication with one or more other users through telephone devices, where the communication data traveling between users is encrypted and decrypted during the call. Encoding and decoding that may be needed to transform the call data into a format that may be processed by encrypting/decrypting and delivering the data into the channels through which the telephone signals are delivered, such as, for example, a speaker (for an incoming transmission) or from a microphone to a transmitter (for an outgoing transmission).

According to the logic shematic flow diagrams illustrated in FIGS. 1-4, preferred arrangements for processing the calls handled with the devices, systems and methods are shown. FIG. 1 illustrates the logic applied for an exemplary embodiment of a secure telephone device in accordance with a preferred implementation of the invention. The interception component intercepts the incoming call. The components implement instructions to determine whether the callerID is present and, if so, the database is searched for an encryption key corresponding with the callerID of the incoming call. If no key is identified, then according to a preferred configuration, the telephone device may be actuated to display a tone or message of the call status, and, according to configuration option, the call may proceed as an unencrypted call or may be terminated.

Referring to FIG. 1, where a corresponding match for the callerID is made with a key, then the call may proceed. An optional step is to determine whether the matched callerID is a number known to be a problem number. The problem number may be based on attributes assigned to the number that may result in the number being designated as a problem number. For example, this may be based on prior calls from the user receiving the call, or other users that provide this data to another user.

In the embodiment where the cryptographic exchange server is utilized, the user receiving the incoming call that is identified as a cryptographic key associated number then accesses the CPS server phone number to communicate and handshake with the exchange server.

Referring to FIG. 2, a preferred implementation of an outgoing cryptographic call is schematically illustrated. The process shows the interception of an outgoing call with an interception component. One of the modules may implement the interception of the outgoing call, and this may be done in conjunction with the telephone device's operating system. The instructions are implemented to determine whether the call placed is a number associated with a cryptographic call. This association may be based on stored database information that corresponds with the number. If an encryption key is located for the number, then the number of the cryptographic exchange server is dialed, and the call continues with the exchange server verifying the incoming call encryption data. If the call is not a call that is through the exchange server, then the dialed number is placed, and when connected, the caller telephone device handshakes with the called telephone device and the call continues.

Where no cryptographic information is identified to correspond with the outgoing call, then the user may have the option of placing the call as an unencrypted call. The user may have the option to convert the call to a cryptographic call, for example, by restarting the procedure upon a prompt to do so, or through a recognizable input that the user may invoke to actuate the process so that the call once again is attempted as a cryptographic call. The schematic illustration of FIG. 2 shows this.

As discussed herein, the user may be provided with options for selecting an inputting a cryptographic key from a database. FIG. 3 illustrates a preferred embodiment where a message or user input is made during a call to convert the call to an encrypted call. In the example illustrated in FIG. 3, the entry of 999 prompts one or more operating modules to implement a process that associates or uses a user input of a cryptographic key and attempts to handshake and commence encryption.

Referring to FIG. 4, a preferred implantation of the telephone device and secure communication system is illustrated in connection with a call waiting feature that a user may employ. For example, one option is that the software implemented to manage the secure communications may disable call waiting (either altogether or so as to be implemented later). For these embodiments, call waiting is not to be allowed to be processed in the cell phone. Another embodiment is designed to operate in connection with the call waiting feature. As illustrated in FIG. 4, the instructions are implemented to intercept an incoming "call waiting" call, place the current call "on hold" along with the in-use encryption key, and then restart the new call using Logic Flow for Incoming Call (see FIG. 1). According to preferred embodiments, the devices, method and system allow a user to switch between multiple active calls insuring that the encryption key is switched as appropriate.

While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims. Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A secure telephone device comprising:
a telephone having an input and an output;
software configured with instructions for implementing telephone operations;
wherein said telephone is configured to receive incoming calls;
wherein said telephone is configured to transmit outgoing calls;
wherein said software includes instructions for implementing the interception of incoming calls, processing said incoming calls cryptographically to generate a result that is delivered to the output of said secure telephone device;
wherein said secure telephone device is configured with software that implements a directory for storage of contacts, wherein said telephone directory comprises a storage container and a lookup directory, wherein said software includes instructions for storing cryptographic key data in conjunction with said contacts, and wherein said key data is contained within said storage container of said telephone directory; and
wherein said cryptographic key data is stored as part of said contacts.

2. The secure telephone device of claim 1, wherein the input comprises a microphone provided on or in communicative association with said secure telephone device and wherein the output comprises a speaker provided on or in communicative association with said secure telephone device.

3. The secure telephone device of claim 1, wherein said instructions for cryptographic processing include instructions for carrying out a cryptographic algorithm.

4. The secure telephone device of claim 1, wherein said contacts include contact names, and wherein said cryptographic key data is stored as part of a said contact name.

5. The secure telephone device of claim 1, wherein said telephone comprises a cellular telephone.

6. A secure telephone device comprising:
a telephone having an input and an output;

a processor;
software configured with instructions for implementing telephone operations, said software including an operating system;
wherein said telephone is configured to receive incoming calls;
wherein said telephone is configured to transmit outgoing calls;
wherein said software includes instructions for implementing the interception of incoming calls, processing said calls cryptographically to generate a result that is delivered to the output of said telephone;
wherein said secure telephone device is configured with software that implements a directory for storage of contacts, and wherein said software includes instructions for storing cryptographic key data in conjunction with said contacts; and
wherein said cryptographic key data is stored as part of a said contact; and including a listening intercept and injection (LII) software module configured with instructions for implementing the interception of incoming calls in conjunction with the cryptographic key data stored as part of said contact,
wherein said LII software module is configured with instructions for processing said incoming calls cryptographically, wherein said LII software module is configured with instructions for injecting the result to said output, and wherein said LII software module is configured with instructions that implement processing of said calls in conjunction with said operating system of said secure telephone device so that calls may be intercepted, processed and the processed call injected back to said operating system for delivery to a designated component of said secure telephone device, wherein the processor is instructed to carry out the instructions so that said incoming calls are intercepted, a cryptographic process is carried out on an incoming call, and the result is then passed along for delivery through instructions implemented by said operating system to provide the output to said telephone output.

7. The device of claim 6, wherein said telephone output comprises a speaker.

8. The device of claim 6, wherein said telephone input comprises a microphone.

9. The device of claim 6, including a talking intercept and injection (TII) software module configured with instructions for intercepting all outgoing calls.

10. The device of claim 9, wherein the TII software module implements processing of said outgoing calls in conjunction with said operating system so that said outgoing calls are processed and injected back to said operating system for delivery to a designated component of the device.

11. The device of claim 9, wherein said TII software module is configured with instructions to implement processing of intercepted outgoing calls cryptographically.

12. The device of claim 11, wherein said processor is instructed to carry out said instructions so that the outgoing calls are intercepted, a cryptographic process is carried out on the outgoing calls, and the result is then passed along for delivery through instructions implemented by said operating system to provide said output to said transmission system.

13. The device of claim 11, including a transmission system for transmitting outgoing calls, wherein said TII software module is configured with instructions for injecting the result back to said operating system for delivery to said transmission system.

14. The device of claim 6, further including a cryptographic key escrow (CKE) software module configured with instructions for managing cryptographic information associated with intended call targets.

15. The device of claim 14, wherein the device includes a telephone directory of intended call targets, wherein said intended call targets are users and include a telephone number, and wherein said CKE software module implements a key escrow system that operates to store key data in conjunction with said telephone directory.

16. The device of claim 15, wherein said telephone directory comprises a storage container and a lookup directory and wherein said key data is contained within said storage container of said telephone directory lookup directory.

17. The device of claim 6, including an outgoing call intercept (OCI) software module that is configured with instructions for managing an association between a telephone number of an outgoing call and encryption data.

18. The device of claim 17, including a cryptographic key escrow (CKE) software module configured with instructions for managing cryptographic information associated with intended call targets, wherein said CKE software module implements storage of escrowed keys, wherein said OCI software module is configured with instructions for implementing the interception of an outgoing call, ascertaining the number of said outgoing call, and comparing that number with cryptographic data to determine whether an escrowed key exists for that number, and, upon locating an outgoing escrowed key for that number, instructing the processor to implement placement of the call as a cryptographic call with full encryption.

19. The device of claim 18, including an incoming call intercept (ICI) software module configured with instructions for implementing the interception of an incoming call, wherein said ICI software module is configured with instructions to implement a search to determine whether said escrowed key system contains a matching key for an incoming call, and, where a match is confirmed, implementing instructions to receive the call as a cryptographic call with full encryption.

20. The device of claim 18, wherein the OCI software module is configured to operate in conjunction with said operating system, so that operating system output data relating to the placement of an outgoing call is intercepted.

21. The device of claim 6, including an incoming call intercept (ICI) software module configured with instructions for implementing the interception of an incoming call.

22. The device of claim 21, wherein said secure telephone device is a device configured for use in connection with an exchange server, and wherein matching key data involves matching key data between said telephone device and said exchange server.

23. The device of claim 6, including a configuration management (CM) software component configured with instructions for managing the configuration options for the placement and receipt of telephone calls, said CM component being configured to implement and apply the configuration options, including a first option where said secure telephone device is configured for use as a peer to peer device for engaging in cryptographic communications with another telephone device, a second option where said secure telephone device is configured for use in connection with an exchange server where encryption is handled between said secure telephone device and an exchange server.

24. The device of claim 23, wherein said CM software component is configured with instructions to implement a configuration option based on a previous use of that option in connection with a call made or received that is associated with the number for which the CM component is applying the configuration option.

25. The device of claim 6, including a special activation management (SAM) software module configured with instructions for converting an existing phone call to a cryptographic call.

26. The device of claim 25, wherein said SAM module software is configured with instructions to receive inputs from the input component of the telephone device for selectively converting a call from a non-cryptographic call to a cryptographic call.

27. The device of claim 6, wherein at least one of said incoming call and said outgoing call comprises an audio stream, and wherein said secure telephone device includes an encoding component that includes software configured with instructions for converting said audio stream into a format that is cryptographically managed.

28. The device of claim 27, including a decoding component that includes software configured with instructions for converting said decrypted but still encoded audio stream into an audio stream that is compatible with said operating system.

29. The secure telephone device of claim 6, wherein said telephone comprises a cellular telephone.

30. A secure telephone device comprising:
   a processor;
   a telephone having an input and an output, wherein the input comprises a microphone provided on or in communicative association with the device, and wherein the output comprises a speaker provided on or in communicative association with the device;
   operating software configured with instructions for implementing the operation of the telephone operations, said operating software comprising an operating system and including software that implements a directory for storage of contacts, and wherein said operating software includes instructions for storing cryptographic key data in conjunction with said contact data;
   a listening intercept and injection (LII) software module configured with instructions for implementing the interception of incoming calls, wherein the LII software module is configured with instructions for processing said incoming calls cryptographically, wherein said LII software module is configured with instructions for injecting the result to said speaker, and wherein said LII software module is configured with instructions that implement processing of said calls in conjunction with said operating system so that said calls are intercepted, processed and the processed call injected back to said operating system for delivery to a designated component of said secure telephone device, wherein said processor is instructed to carry out the instructions so that said incoming calls are intercepted, a cryptographic process is carried out on said incoming calls, and the result is then passed along for delivery through instructions implemented by said operating system to provide the output to said speaker;
   a talking intercept and injection (TII) software module configured with instructions for intercepting outgoing calls and implementing the cryptographic processing of intercepted outgoing calls;
   a transmission system for transmitting outgoing call calls, wherein said TII module software is configured with instructions for injecting the result back to said operating system for delivery to said transmission system and wherein said TII software module is configured with instructions that implement processing of said outgoing calls in conjunction with said operating system of the device so that the outgoing calls may be processed and injected back to said operating system for delivery to said transmission component;
   wherein said processor is instructed to carry out the instructions so that said outgoing calls are intercepted, a cryptographic process is carried out on the outgoing calls, and the result is then passed along for delivery through instructions implemented by said operating system to provide the output to said transmission system;
   a cryptographic key escrow (CKE) software module configured with instructions for managing cryptographic information associated with intended call targets;
   a telephone directory of intended call targets, wherein said intended call targets are users and include a telephone number, and wherein said CKE module implements a key escrow system that operates to store key data in conjunction with said telephone directory;
   wherein said telephone directory comprises a storage container and a lookup directory and wherein said key data is contained within said storage container of said telephone directory; an outgoing call intercept (OCI) software module configured with instructions for managing an association between a telephone number of an outgoing call and encryption data, said OCI software module being configured with instructions for implementing the interception of an outgoing call, ascertaining the number of said outgoing call, and comparing that number with cryptographic data to determine whether an escrowed key exists for that phone number, and, upon locating an outgoing escrowed key for that number, instructing the processor to implement placement of said call as a cryptographic call with full encryption, wherein said OCI software module is configured to operate in conjunction with said operating system so that the operating system output data relating to the placement of an outgoing call is intercepted;
   an incoming call intercept (ICI) software module configured with instructions for implementing the interception of an incoming call and implementing a search to determine whether said escrowed key system contains a matching key for said incoming call, and, where a match is confirmed, implementing instructions to receive said call as a cryptographic call with full encryption;
   a special activation management (SAM) software module configured with instructions for converting an existing phone call to a cryptographic call;
   wherein said SAM software module is configured with instructions to receive inputs from said input for selectively converting a call from a non-cryptographic call to a cryptographic call;
   an encoding component that includes software configured with instructions for converting the audio stream of a said call into a format that may be cryptographically managed;
   a decoding component that includes software configured with instructions for converting the decrypted but still encoded audio stream into an audio stream that is compatible with said operating system;
   wherein said telephone is configured to receive incoming calls;
   wherein said telephone is configured to transmit outgoing calls; and
   wherein said operating software includes instructions for implementing the interception of incoming calls and processing said calls cryptographically to generate a result that is delivered to said speaker.

31. The secure telephone device of claim 30, wherein said telephone comprises a cellular telephone.

* * * * *